United States Patent
Parsons (10) Patent No.: US 7,254,303 B2
(45) Date of Patent: Aug. 7, 2007

(54) OPTICAL TUBE ASSEMBLY HAVING A DRY INSERT AND METHODS OF MAKING THE SAME

(75) Inventor: Alan T. Parsons, Newton, NC (US)

(73) Assignee: Corning Cable Systems, LLC., Hickory, NC (US)

(*) Notice: Subject to any disclaimer, the term of this patent is extended or adjusted under 35 U.S.C. 154(b) by 0 days.

(21) Appl. No.: 10/807,530

(22) Filed: Mar. 23, 2004

(65) Prior Publication Data

US 2005/0213902 A1 Sep. 29, 2005

(51) Int. Cl.
*G02B 6/44* (2006.01)
(52) U.S. Cl. .................. 385/102; 385/100; 385/103
(58) Field of Classification Search ............ 385/105, 385/110–114
See application file for complete search history.

(56) References Cited

U.S. PATENT DOCUMENTS

| | | | | |
|---|---|---|---|---|
| 4,309,072 A | * | 1/1982 | Tweeddale | 385/102 |
| 4,514,035 A | * | 4/1985 | Steinmann et al. | 385/103 |
| 4,707,569 A | | 11/1987 | Yoshimura et al. | 174/116 |
| 4,725,628 A | | 2/1988 | Garvey et al. | 521/137 |
| 4,725,629 A | | 2/1988 | Garvey et al. | 521/137 |
| 4,763,983 A | * | 8/1988 | Keith | 385/102 |
| 4,815,813 A | * | 3/1989 | Arroyo et al. | 385/102 |
| 4,818,060 A | | 4/1989 | Arroyo | 350/96.23 |
| 4,909,592 A | | 3/1990 | Arroyo et al. | 350/96.23 |
| 4,913,517 A | | 4/1990 | Arroyo et al. | 350/96.23 |
| 5,016,952 A | | 5/1991 | Arroyo et al. | 350/96.2 |
| 5,133,034 A | | 7/1992 | Arroyo et al. | 385/107 |
| 5,224,190 A | | 6/1993 | Chu et al. | 385/107 |
| 5,243,675 A | | 9/1993 | Kathiresan et al. | 385/109 |
| 5,377,290 A | * | 12/1994 | Ohta et al. | 385/100 |
| 5,422,973 A | | 6/1995 | Ferguson et al. | 385/112 |

(Continued)

FOREIGN PATENT DOCUMENTS

DE 10129772 A1 1/2003

(Continued)

OTHER PUBLICATIONS

Norris, R. H.; Weimann, P.A., "Dry Central Tube Ribbon Cables for the Outside Plant Environment", Proc. Of the 51$^{st}$ Intern. Wire & Cable Symposium, p. 202-210 (2002).

(Continued)

*Primary Examiner*—Frank G. Font
*Assistant Examiner*—Charlie Peng (57) ABSTRACT

An optical tube assembly and method of manufacture include at least one optical waveguide, at least one dry insert that generally surrounds the at least one optical waveguide, and a tube. The dry insert includes a tape and at least one filament attached to the tape, thereby forming a plurality of loops. In preferred embodiments, either the tape or the at least one filament of the dry insert has a water-swellable component. Additionally, the optical tube assembly may be a portion of a fiber optic cable.

45 Claims, 5 Drawing Sheets

U.S. PATENT DOCUMENTS

| | | | |
|---|---|---|---|
| 5,509,097 A | 4/1996 | Tondi-Resta et al. | 385/113 |
| 5,542,020 A * | 7/1996 | Horska | 385/113 |
| 5,621,841 A * | 4/1997 | Field | 385/113 |
| 5,621,842 A | 4/1997 | Keller | 385/114 |
| 5,698,615 A | 12/1997 | Polle | 523/173 |
| 5,763,067 A | 6/1998 | Bruggemann et al. | 428/317.9 |
| 5,875,526 A * | 3/1999 | Yamaguchi | 24/445 |
| 6,091,871 A | 7/2000 | Elisson et al. | 385/113 |
| 6,226,431 B1 | 5/2001 | Brown et al. | 385/114 |
| 6,229,944 B1 | 5/2001 | Yokokawa et al. | 385/114 |
| 6,259,844 B1 * | 7/2001 | Logan et al. | 385/113 |
| 6,278,826 B1 | 8/2001 | Sheu | 385/109 |
| 6,504,979 B1 * | 1/2003 | Norris et al. | 385/109 |
| 6,574,400 B1 * | 6/2003 | Lail | 385/102 |
| 2003/0044137 A1 | 3/2003 | Lopez | |
| 2004/0208463 A1* | 10/2004 | Park | 385/114 |

FOREIGN PATENT DOCUMENTS

| | | |
|---|---|---|
| EP | 0577233 A1 | 1/1994 |
| JP | 61-023104 | 1/1986 |
| JP | 9-152535 | 6/1997 |
| JP | 11-271581 | 10/1999 |
| JP | 11-337783 | 12/1999 |
| JP | 2001-343565 | 12/2001 |
| JP | 2001-343566 | 12/2001 |
| JP | 2002-236241 | 8/2002 |

OTHER PUBLICATIONS

Van Vickle, P., et al., "Innovative Dry Buffer Tube Design for Central Tube Ribbon Cable", Proc. Of the 2001 National Fiber Optics Engineers Conference, p. 154-161 (2001).

Taylor, C., et al., "Effect of Water Blocking Materials On Moisture Diffusion in Prototype Cable Structures", Proc. of the 50$^{th}$ Intern. Wire & Cable Symposium, p. 518-525 (2001).

Dixon, L., et al., "Crush and Bending Resistance in Next Generation Cable Designs", Proc. Of the 50$^{th}$ Intern. Wire & Cable Symposium, p. 422-431 (2001).

Wagman, R., et al., "BOTDR Analysis of Cable Tensile Testing", Proc. Of the 48$^{th}$ Intern. Wire & Cable Symposium, p. 658-664 (1999).

Beasley, B., "Look, Mom! No Gel!" Outside Plant Magazine. Dec. 2002. p. 16-18.

Geca-Tapes, Non-Woven Wrapping-Tapes Catalog "Foam Tapes", Apr. 1996.

Geca-Tapes, Waterblocking Tapes Catalog—"Waterblocking Foam Tapes", Apr. 1996.

Dow Plastics, "Resin For Pipe Extrusion and Pipe Fittings", Apr. 7, 2003.

* cited by examiner

OPTICAL TUBE ASSEMBLY HAVING A DRY INSERT AND METHODS OF MAKING THE SAME

FIELD OF THE INVENTION

The present invention relates generally to dry packaging of optical waveguides. More specifically, the invention relates to an optical tube assembly that includes a dry insert for protecting at least one optical waveguide.

BACKGROUND OF THE INVENTION

Fiber optic cables include optical waveguides such as optical fibers that transmit optical signals, for example, voice, video, and/or data information. One type of fiber optic cable configuration includes an optical waveguide disposed within a tube, thereby forming a tube assembly. Generally speaking, the tube protects the optical waveguide; however, the optical waveguide must be further protected within the tube. For instance, the optical waveguide should have some relative movement between the optical waveguide and the tube to accommodate bending. Additionally, the optical waveguide should be adequately coupled with the tube, thereby inhibiting the optical waveguide from being displaced within the tube when, for example, pulling forces are applied to install the cable. Additionally, the tube assembly should inhibit the migration of water therein. Moreover, the tube assembly should be able to operate over a range of temperatures without undue optical performance degradation.

Conventional optical tube assemblies meet these requirements by filling the tube with a thixotropic material such as grease. Thixotropic materials generally allow for adequate movement between the optical waveguide and the tube, cushioning, and coupling of the optical waveguide. Additionally, thixotropic materials are effective for blocking the migration of water within the tube. However, the thixotropic material must be cleaned from the optical waveguide before connectorization of the same. Cleaning the thixotropic material from the optical waveguide is a messy and time-consuming process. Moreover, the viscosity of thixotropic materials is generally temperature dependent. Due to changing viscosity, the thixotropic materials can drip from an end of the tube at relatively high temperatures and the thixotropic materials may cause undesirable optical attenuation at relatively low temperatures.

Cable designs have attempted to eliminate thixotropic materials from the tube, but the designs are generally inadequate because they do not meet all of the requirements and/or are expensive to manufacture. One example that eliminates the thixotropic material from the tube is U.S. Pat. No. 4,909,592, which discloses a tube having water-swellable tapes and/or yarns disposed therein. This design requires a large number of water-swellable components within the tube to adequately couple optical fibers to the tube. The use of large numbers of water-swellable components is not economical because it increases the cost of the cable. Another example that eliminates the thixotropic material is U.S. Pat. No. 6,278,826, which discloses a foam having a moisture content greater than zero that is loaded with super-absorbent polymers. The moisture content of the foam is described as improving the flame-retardant characteristics of the foam. Likewise, the foam of this design is relatively expensive and increases the cost of the cable. Thus, previous dry fiber optic cable designs have yet to enjoy commercial success.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 1:
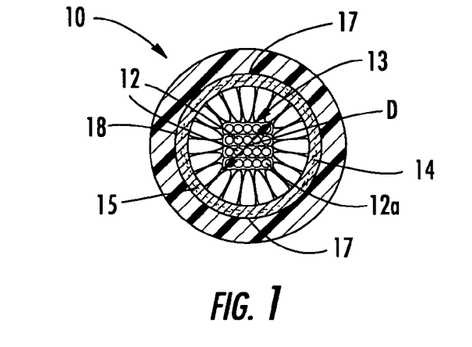
FIG. 1 is a cross-sectional view of a tube assembly according to the present invention.

Illustrated in FIG. 1 is an exemplary tube assembly 10 according to one aspect of the present invention. Tube assembly 10 includes at least one optical waveguide 12, at least one dry insert 14, and a tube 18. In this case, the at least one optical waveguide 12 is in the form of a stack of ribbons 13 having a diagonal D dimension across the corners of the stack. Dry insert 14 generally surrounds the at least one optical waveguide 12 and forms core 15, which is disposed within tube 18. Dry insert 14 performs functions such as cushioning, coupling, inhibiting the migration of water, and accommodates bending. Dry insert 14 is advantageous because the optical waveguides are easily removed therefrom without leaving a residue or film that requires cleaning before connectorization. Moreover, unlike conventional thixotropic materials, dry insert 14 does not change viscosity with temperature variations or have a propensity to drip from an end of the tube at high temperatures. Furthermore, tube assembly 10 may include other suitable components such as a polyester binder thread 17 to hold dry insert 14 about optical waveguide 12. Likewise, two or more threads may be stitched together for holding dry insert 14 together before extruding tube 18 therearound.

Figure 1A:
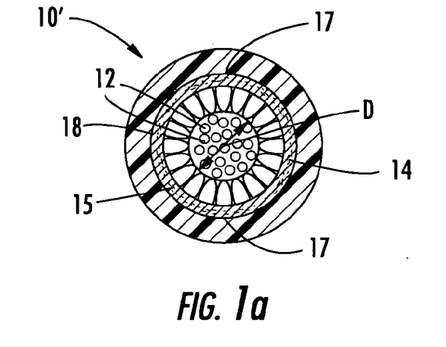
FIG. 1a is a cross-sectional view of another tube assembly according to the present invention.
Figure 5:
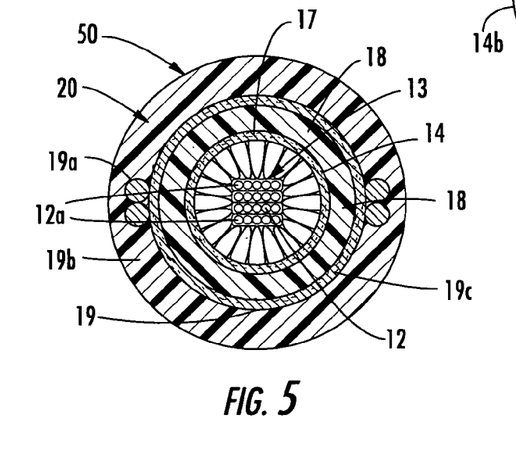
FIG. 5 is a cross-sectional view of a fiber optic cable according to one embodiment of the present invention.

FIG. 1a shows tube assembly 10', which is a variation of tube assembly 10. Specifically, tube assembly 10' includes a plurality of loose optical waveguides 12, instead of the stack of ribbons 13. In this case, tube assembly 10' includes twenty-four loose optical waveguides 12 having diagonal dimension D, but any suitable number of optical waveguides may be used. Moreover, optical waveguides 12 may be bundled into one or more groups using binders, water-swellable threads, tapes, wraps, or other suitable materials. Additionally, tube assemblies 10 or 10' can be a portion of cable, one example of which is shown in FIG. 5.

As depicted, optical waveguide 12 is an optical fiber that forms a portion of an optical fiber ribbon. In this case, the optical waveguides are a plurality of single-mode optical fibers in a ribbon format that form ribbon stack 13. Ribbon stack 13 can include helical or S-Z stranding. Additionally, other types or configurations of optical waveguides can be used. For example, optical waveguide 12 can be multi-mode, pure-mode, erbium doped, polarization-maintaining fiber, other suitable types of light waveguides, and/or combinations thereof. Moreover, optical waveguide 12 can be loose or in bundles. Each optical waveguide 12 may include a silica-based core that is operative to transmit light and is surrounded by a silica-based cladding having a lower index of refraction than the core. Additionally, one or more coatings can be applied to optical waveguide 12. For example, a soft primary coating surrounds the cladding, and a relatively rigid secondary coating surrounds the primary coating. In one embodiment, one or more optical waveguides 12 include a coating system as disclosed in U.S. patent application Ser. No. 10/632,219 filed on Jul. 18, 2003, the disclosure of which is incorporated herein by reference. Optical waveguide 12 can also include an identifying means such as ink or other suitable indicia for identification. Suitable optical fibers are commercially available from Corning Incorporated of Corning, N.Y.

In other embodiments, ribbon stack 13 can have one or more corner optical waveguides 12a with a predetermined MAC number, thereby inhibiting optical attenuation of the corner optical waveguide when subjected to compressive forces. Stated another way, selecting corner optical waveguides with a predetermined MAC number places optical waveguides that are less sensitive to optical attenuation from compressive forces in ribbon stack locations that experience relatively high levels of compression. As used herein, MAC number is calculated as a mode field diameter (MFD) divided by a cutoff wavelength for the given optical waveguide 12a where both quantities are expressed in micrometers so that the MAC number is dimensionless. In other words, MFD is typically expressed in micrometers and cutoff wavelength is typically expressed in nanometers, so the cutoff wavelength must be divided by 1000 to convert it to micrometers, thereby yielding a dimensionless MAC number.

The MAC number of corner optical waveguides may be selected as about 7.35 or less, more preferably about 7.00 or less, and most preferably about 6.85 or less. By way of example, corner optical waveguide(s) 12a is selected with a MFD of 9.11 μm or less and a cutoff wavelength of 1240 nm or more, thereby yielding 7.35 or less for the MAC number. Generally speaking, the MAC number is directly proportional to MFD and inversely proportional to the cutoff wavelength. Ribbon stack 13 has four corner optical waveguides 12a; however, other ribbon stack configurations can include more corner positions. For instance, a ribbon stack having a generally plus sign shape includes eight outer corner optical waveguides. Likewise, other ribbon stack configurations may have other numbers of corner positions.

Additionally, ribbon embodiments of the present invention may have a positive excess ribbon length (ERL), although a negative ERL is possible. As used herein, ERL is defined as the length of the particular ribbon minus the length of the tube or cable containing the ribbon divided by the length of the tube or cable containing the ribbon, which can be expressed as a percentage by multiplying by 100. Whether the ERL is calculated using the tube length or the cable length depends on the particular configuration. Moreover, individual ribbons of a cable can have different values of ERL. By way of example, ribbons of the cable have a positive ERL, preferably a positive ERL in the range of about 0.0% to about 0.2% or greater. Likewise, embodiments having loose or bundled optical fibers may include a positive excess fiber length (EFL).

Figure 2:
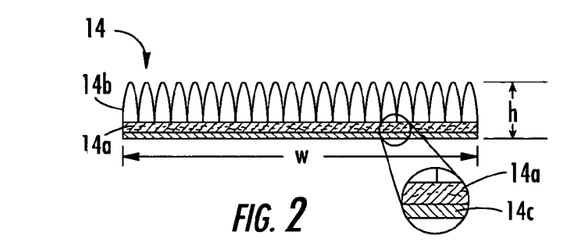
FIG. 2 is a cross-sectional view of the dry insert of the tube assembly of FIG. 1.

FIG. 2 illustrates a cross-sectional view of an exemplary dry insert 14 according to the present invention. Dry insert 14 is formed as an elongate assembly that is capable of being paid off from a reel for a continuous application during manufacture. Dry insert 14 is preferably formed from a plurality of materials that may perform different functions in the tube assembly. For instance, dry insert 14 cushions optical waveguide 12 from tube 18, thereby maintaining optical attenuation of optical waveguide 12 below about 0.4 dB/km at a reference wavelength of 1310 nm and 0.3 dB/km at a reference wavelengths of 1550 nm and 1625 nm. Dry insert 14 is formed from two distinct materials. In preferred embodiments, a first material of dry insert 14 is a tape 14a and a second material is a filament 14b that is attached to the tape. Generally speaking, dry insert 14 is compressible and generally has a predetermined spring constant, thereby providing adequate coupling characteristics within the assembly.

Different first materials may be used for tape 14a. For instance, suitable tapes 14a may include woven tapes, non-woven tapes, cloth-like tapes, polymer tapes, foam tapes, and/or any other suitable material(s). Tape 14a can also have a water-swellable substance or component. Moreover, tape 14a can be formed from one or more layers such as laminated layers or be a composite material and may include a water-swellable tape as one of the layers. For instance, attaching or bonding a portion of dry insert 14 to tube 18 can be accomplished by using a tape layer. As depicted, adhesives, glues, elastomers, and/or polymers layers 14c may be disposed on a portion of the surface of dry insert 14 that contacts tube 18 for attaching dry insert 14 to tube 18 when the same is extruded thereover.

If a foam tape is used it can be an open or closed cell, but in preferred embodiments it is a polyurethane (PU) foam tape. The PU foam tape may either be an ether-based PU or an ester-based PU, but other suitable foam tapes having compressible layers can be used such as a polyethylene foam, a polypropylene foam, or EVA foam. However, preferred embodiments using foam tapes are an ether-based foam tape since it performs better than an ester-based PU foam when subject to moisture. In other words, the ester-based PU foam can break down with moisture, whereas the ether-based PU foam is generally more robust with respect to moisture. Additionally, if foam tape is used it should have a predetermined density generally in the range of about 1 lb/ft$^3$ to about 3 lb/ft$^3$, but in preferred embodiments the density is about 2 lb/ft$^3$.

Likewise, dry insert 14 can include one or more second materials as filament 14b. By way of example, suitable filaments 14b formed from the second material include water-swellable yarns, or non-swellable threads. By way of example, non-swellable threads may be formed from cottons, rayons, polyesters, elastomers, fiberglass, aramids, polymers, rubber-based urethanes, composite materials and/ or other suitable materials. Furthermore, dry insert 14 can include different types of filaments to tailor properties and/or reduce the cost of dry insert 14. For instance, one or more filaments 14b is a non-swellable thread and one or more filaments 14b is a water-swellable filament. Additionally, suitable water-swellable filaments are, for example, LANSEAL materials available from Toyobo of Osaka, Japan or OASIS available from Technical Absorbents Ltd. of South Humberside, United Kingdom.

Figure 2A:
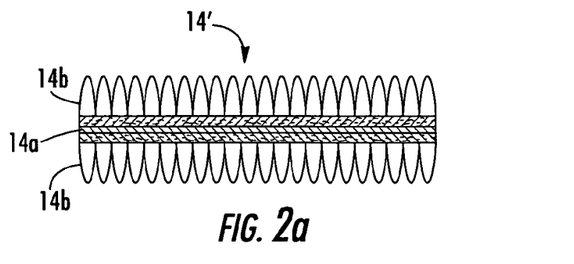
FIG. 2a is a cross-sectional view of another dry insert according to the present invention.

However, in preferred embodiments of dry insert 14 at least one of either tape 14a or filament 14b is a water-swellable material that inhibits the migration of water along the assembly. Filaments 14b formed from the second material may be attached to the tape in any suitable manner such as adhesives and/or stitching. As shown in FIG. 2, portions of filament 14b are attached so that loops are formed. Additionally, the loops can be formed with a specific density per unit area. Filaments 14b may protrude on one side of tape 14a as shown in FIG. 2 or filaments 14b may protrude from both sides of tape 14a as shown in FIG. 2a. When constructed, filaments 14b preferably are facing the optical fibers or ribbons so that they provide cushioning for the same.

Dry insert 14 also has a predetermined ultimate tensile strength to inhibit breakage during manufacture. Generally speaking, the majority of the tensile strength is provided by tape 14a. The ultimate tensile strength of the dry insert 14 is preferably about 20 Newtons per centimeter width W of dry insert 14 or greater, more preferably about 30 Newtons per centimeter width W of dry insert 14 or greater. Additionally, dry insert 14 preferably has a water-swell speed so that the majority of swell height of the water-swellable substance occurs within about 120 seconds or less after being exposed to water, more preferably about 90 seconds or less.

Figure 10:
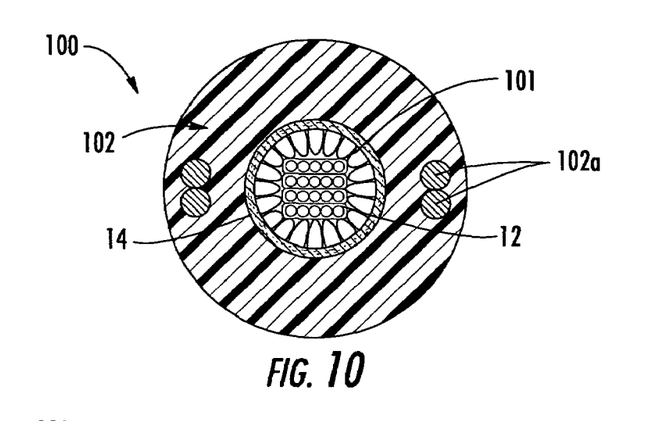
FIG. 10 is a cross-sectional view of a tubeless fiber optic cable according to the present invention.

Dry insert 14 may be compressed during assembly so that it provides a predetermined normal force that inhibits optical waveguide 12 from being easily displaced longitudinally along tube 18. Dry insert 14 preferably has an uncompressed height h of about 5 mm or less for minimizing the tube diameter and/or cable diameter, thereby allowing a smaller tube/cable. However, any suitable height h can be used for dry insert 14. Additionally, height h of dry insert 14 need not be constant across the width, but can vary, thereby conforming to the cross-sectional shape of the optical waveguides and providing improved cushioning to improve optical performance (FIG. 10). After assembly, compression of dry insert 14 is actually a localized maximum compression of dry insert 14. In the case of FIG. 1, the localized maximum compression of dry insert 14 occurs at the corners of the ribbon stack across the diameter. Calculating the percentage of compression of dry insert 14 in FIG. 1 requires knowing an inner diameter of tube 18, a diagonal D dimension of the ribbon stack, and an uncompressed height h of dry insert 14. By way of example, inner diameter of tube 18 is 7.1 mm, diagonal D of the ribbon stack is 5.1 mm, and the uncompressed height h of dry insert 14 across a diameter is 3.0 mm (2 times 1.5 mm). Adding diagonal D (5.1 mm) and the uncompressed height h of dry insert 14 across the diameter (3.0 mm) yields an uncompressed dimension of 8.1 mm. When placing the ribbon stack and dry insert 14 and into tube 18 with an inner diameter of 7.1 mm, dry insert is compressed a total of 1 mm (8.1 mm–7.1 mm). Thus, dry insert 14 is compressed by about thirty percent across the diameter of tube 18.

In other embodiments, dry insert 14 is generally uncompressed in tube assembly 10, but begins to compress if optical waveguide movement is initiated, thereby creating a friction force. The friction force creates coupling between the optical waveguides and the tube of the assembly, but should be tailored so that optical performance is maintained. Other variations include attaching or bonding a portion of dry insert 14 to tube 18. For example, adhesives, glues, elastomers, and/or polymers 14c are disposed on a portion of the surface of dry insert 14 that contacts tube 18 for attaching dry insert 14 to tube 18. Additionally, it is possible to helically wrap dry insert 14 about optical waveguide 12, instead of being longitudinally disposed. In still further embodiments, two or more dry inserts 14 can be formed about one or more optical waveguides 12 such as two halves placed within tube 18.

Figure 3A:
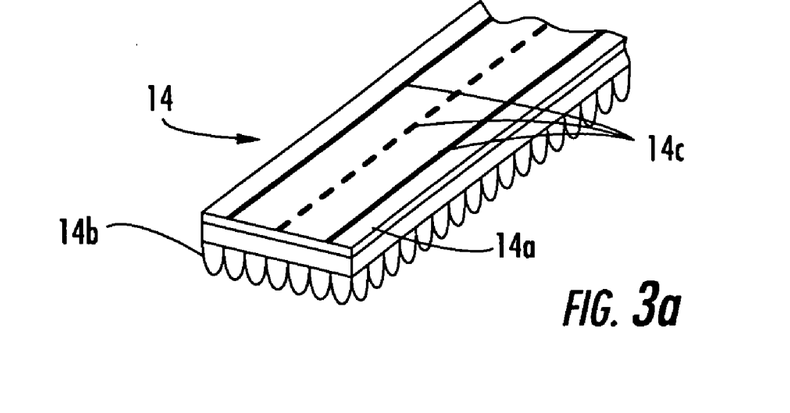
FIGS. 3a-3c depict dry inserts having adhesives applied to a surface thereof according to the present invention.
Figure 3B:
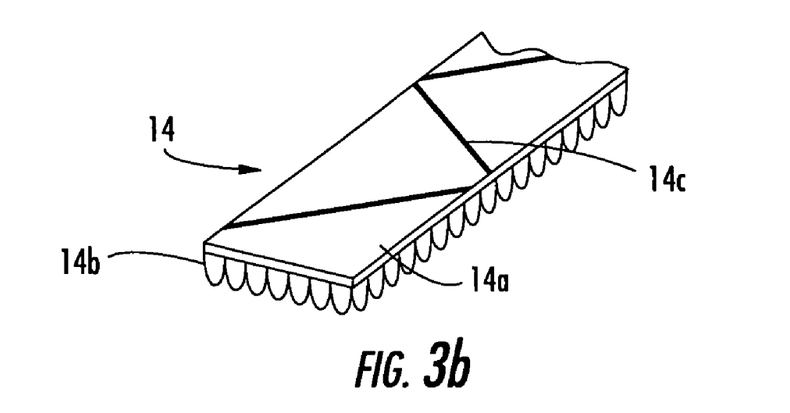
Figure 3C:
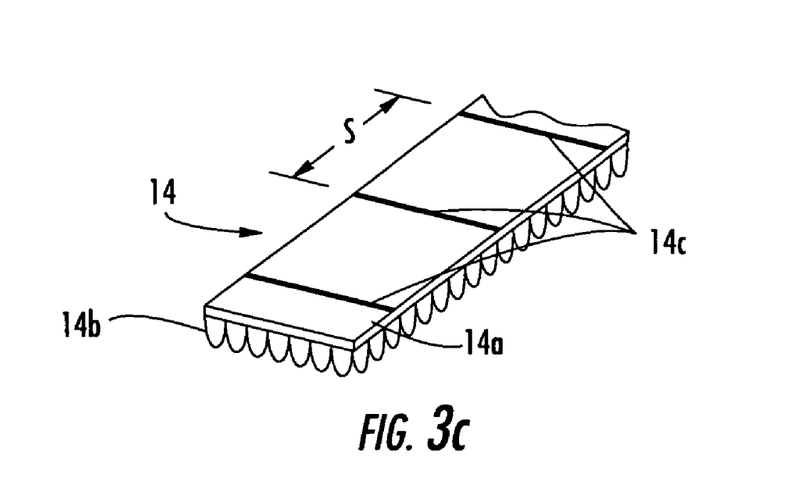

By way of example, a fugitive glue/adhesive is used for coupling cable core 15 and/or dry insert 14 with tube 18. The glue/adhesive or the like is applied to the radially outward surface of dry insert 14, for instance, during the manufacturing process. The fugitive glue/adhesive is applied while hot or melted to the outer surface of dry insert 14 and then is cooled or frozen when the cable is quenched or cools off. A suitable fugitive glue is available from National Starch and Chemical Company of Bridgewater, N.J. under the tradename LITE-LOK® 70-003A. The fugitive glue or other suitable adhesive/material may be applied in beads having a continuous or an intermittent configuration as shown in FIGS. 3a-3c. For instance, one or more adhesive/glue beads may be longitudinally applied along the dry insert, longitudinally spaced apart beads, in a zig-zag bead along the longitudinal axis of the dry insert, or in any other suitable configuration.

In one application, a plurality of beads of fugitive glue/adhesive or the like is applied to dry insert 14. For instance, three continuous, or non-continuous, beads can be disposed at locations so that when the dry insert is formed about the ribbon stack the beads are about 120 degrees apart. Likewise, four beads can be disposed at locations so they are about 90 degrees apart when the dry insert is formed about the optical waveguides. In embodiments having the beads spaced apart along the longitudinal axis, the beads may have a longitudinal spacing S of about 20 mm and about 800 mm or more; however, other suitable spacing may be used. Additionally, beads may be intermittently applied for minimizing the amount of material required, thereby reducing manufacturing expense while still providing sufficient coupling/adhesion.

Since tube assemblies 10 are not filled with a thixotropic material the tube may deform or collapse, thereby forming an oval shaped tube instead of a round tube. U.S. patent application Ser. No. 10/448,509 filed on May 30, 2003, the disclosure of which is incorporated herein by reference, discusses dry tube assemblies where the tube is formed from a bimodal polymeric material having a predetermined average ovality. As used herein, ovality is the difference between a major diameter D1 and a minor diameter D2 of tube 18 divided by major diameter D1 and multiplied by a factor of one-hundred, thereby expressing ovality as a percentage. Bimodal polymeric materials include materials having at least a first polymer material having a relatively high molecular weight and a second polymer material having a relatively low molecular weight that are manufactured in a dual reactor process. This dual reactor process provides the desired material properties and should not be confused with simple post reactor polymer blends that compromise the properties of both resins in the blend. In one embodiment, the tube has an average ovality of about 10 percent or less. By way of example, tube 18 is formed from a HDPE available from the Dow Chemical Company of Midland, Mich., under the tradename DGDA-2490 NT.

Additionally, dry insert 14 should be selected so that the ribbon stack has a predetermined normalized optical ribbon pullout force (N/m), thereby ensuring proper coupling. The ribbon pullout force measures the force required to initiate movement of a ribbon stack from a 10-meter length of cable. Of course, this test is equally applicable to loose or bundled optical waveguides. Specifically, the stack of ribbons are pulled from the tube and the force required to initiate movement was divided by the length of the cable, thereby normalizing the optical ribbon pullout force. In preferred embodiments, the optical waveguides have a normalized ribbon pullout force in the range of about 0.5 N/m to about 5.0 N/m, more preferably, in the range of about 1 N/m to about 4 N/m.

Figure 4:
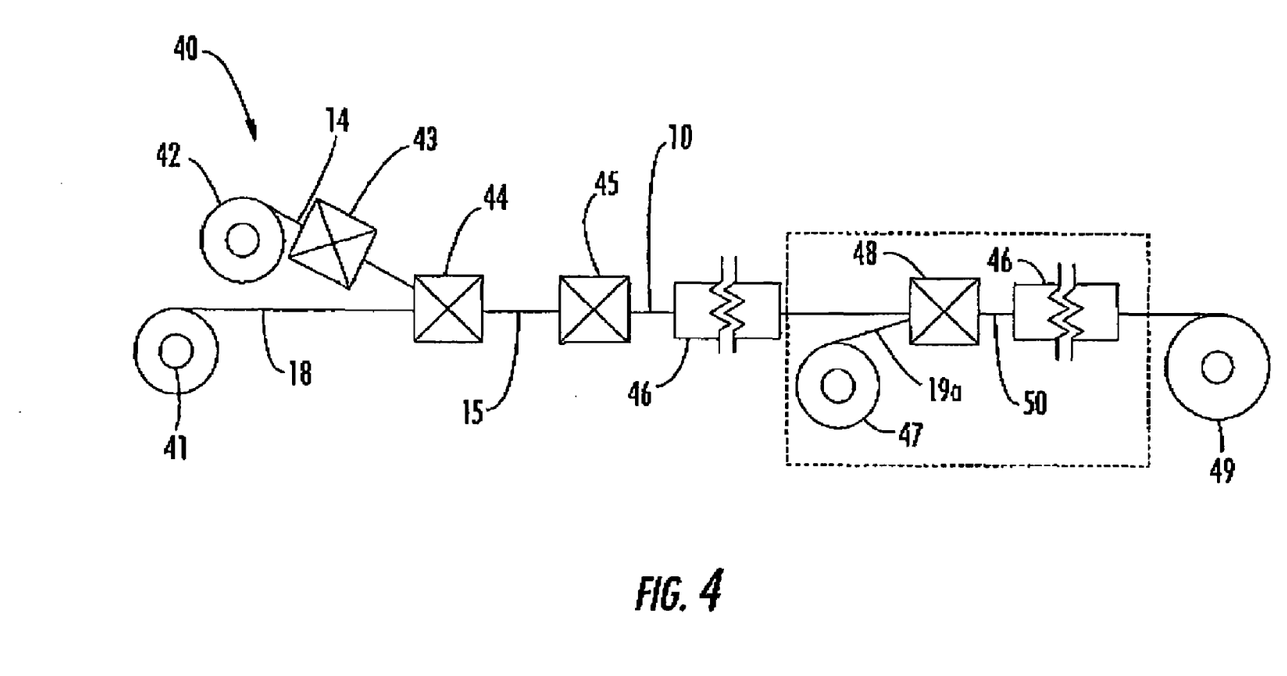
FIG. 4 is a schematic representation of a manufacturing line according to the present invention.

FIG. 4 schematically illustrates an exemplary manufacturing line 40 for tube assembly 10 according to the present invention. Manufacturing line 40 includes at least one optical waveguide payoff reel 41, a dry insert payoff reel 42, an optional glue/adhesive station 43, a binding station 44, a cross-head extruder 45, a water trough 46, and a take-up reel 49. Additionally, tube assembly 10 may have a sheath 20 therearound, thereby forming a cable 50 as illustrated in FIG. 5. Sheath 20 can include strength members 19a and a jacket 19b, which can be manufactured on the same line as tube assembly 10 or on a second manufacturing line. The exemplary manufacturing process includes paying-off at least one optical waveguide 12 and dry insert 14 from respective reels 41 and 42. Only one payoff reel for optical waveguide 12 and dry insert 14 are shown for clarity; however, the manufacturing line can include any suitable number of payoff reels to manufacture tube assemblies and cables according to the present invention. Next, an adhesive/glue is applied to the outer surface of dry insert 14 at station 43. Then dry insert 14 is generally positioned around optical waveguide 12 and binding station wraps or sews one or more binding threads around dry insert 14, thereby forming core 15. Thereafter, core 15 is feed into cross-head extruder 45 where tube 18 is extruded about core 15, thereby forming tube assembly 10. Tube 18 is then quenched in water trough 46 and then tube assembly 10 is wound onto take-up reel 49. As depicted in the dashed box, if one manufacturing line is set-up to make cable 50, then strength members 19a are paid-off reel 47 and positioned adjacent to tube 18, and jacket 19b is extruded about strength members 19a and tube 18 using cross-head extruder 48. Thereafter, cable 50 passes into a second water trough 46 before being wound-up on take-up reel 49. Additionally, other cables and/or manufacturing lines according to the concepts of the present invention are possible. For instance, cables and/or manufacturing lines may include a water-swellable tape 19c and/or an armor between tube 18 and strength members 19a; however, the use of other suitable cable components are possible.

In addition to the predetermined ribbon pullout characteristics, assemblies of the present invention should have a predetermined ribbon coupling force. The ribbon coupling force generally models the forces applied to the optical waveguide(s) when subjecting a cable to, for example, pulling during installation of the cable. Although the ribbon pullout force and the ribbon coupling force may have forces in the same general range, the ribbon coupling force is generally a better indicator of actual cable performance.

The ribbon coupling of an assembly may be measured by simulating an underground cable installation in a duct by applying 600 pounds of tension on a 250 m length of cable by placing pulling sheaves on the respective sheaths of the cable ends. However, other suitable loads, lengths, and/or installation configurations can be used for characterizing ribbon coupling in other simulations. Thereafter, the force on the optical waveguide(s) along its length is measured from the end of cable. The force on the optical waveguide(s) is measured using a Brillouin Optical Time-Domain Reflectometer (BOTDR). Determining a best-fit slope of the curve normalizes the ribbon coupling force. Assemblies of the present invention preferably have a ribbon coupling force in the range of about 0.5 N/m to about 5.0 N/m, more preferably, in the range of about 1 N/m to about 4 N/m. However, other suitable ranges of ribbon coupling force may provide the desired performance.

Figure 6:
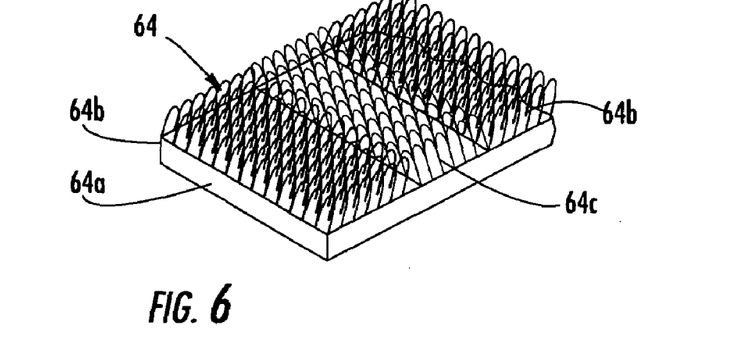
FIG. 6 is a perspective view of another dry insert according to the concepts of the present invention.

Additionally, the concepts of the present invention can be employed with other configurations of the dry insert. As depicted in FIG. 6, dry insert 64 has a tape 64a and a plurality of filaments 64b, 64c of different types. In one configuration, filaments 64b have a water-swellable substance and filaments 64c are formed from, for example, an elastomer for providing a friction component, thereby inhibiting the unintended migration of the optical waveguides. Although, dry insert 64 has the different types of filaments 64b, 64c in an alternating transverse arrangement on dry insert 64 other suitable arrangements are possible. By way of example, the different types of filaments 64b, 64c may be attached in a longitudinal arrangement on dry insert 64.

In another configuration of FIG. 6, filaments 64b, 64c may include different types of water-swellable substances. For instance, two different water-swellable substances are disposed in, or on, the filaments 64b, 64c so that the assembly is useful for multiple environments and/or has improved water-blocking performance. For instance, first filaments 64b can include a first water-swellable component effective for ionized liquids such as saltwater and second filaments 64c are effective for non-ionized liquids. By way of example, the water-swellable material of filament 64b is a polyacrylamide and the water-swellable material of filament 64c is a polyacrylate superabsorbent. Moreover, filaments 64b, 64c can occupy predetermined sections of tape 64a. By alternating the water-swellable materials, the tape is useful for standard applications, salt-water applications, or both. Other variations of different water-swellable substances include having a water-swellable substance with different swell speeds and/or gel strengths. Additionally, the concept of using more than one type of water-swellable material can be applied to the tape.

Figure 7:
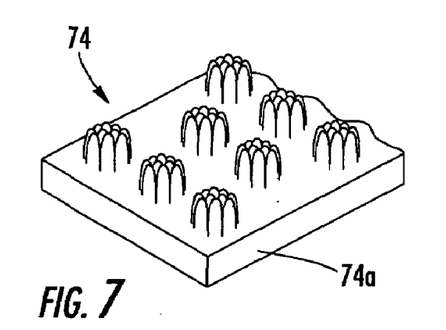
FIG. 7 is a cross-sectional view of another dry insert according to the concepts of the present invention.

FIG. 7 illustrates a dry insert 74 according to another embodiment of the present invention. Specifically, filaments 74b are intermittently spaced on tape 74a. Any suitable size, shape, and/or pattern of filaments 74b that provides the necessary characteristics are possible. For instance, the size, shape, and/or pattern of filaments can be selected and arranged about the corner optical waveguides of the stack, thereby improving corner optical waveguide performance by tailoring the normal force on the optical waveguides.

Figure 8:
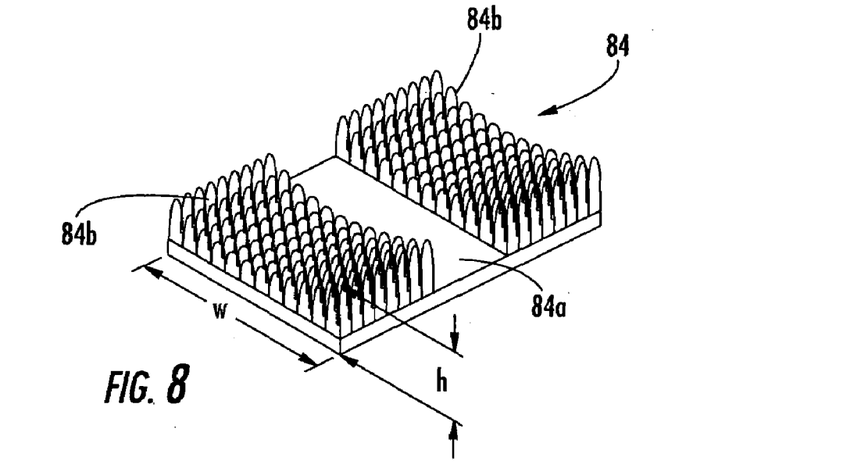
FIG. 8 is a perspective view of another dry insert according to the concepts of the present invention.

FIG. 8 depicts a dry insert 84, which illustrates other concepts of the present invention. Dry insert 84 includes a tape 84a and a plurality of filaments 84b. Dry insert 84 includes intermittently spaced groups of filaments. Additionally, filaments 84b have a height h that varies across their width w. Stated another way, the elements are shaped to conform to the shape of the optical waveguides they are intended to generally surround.

Figure 9:
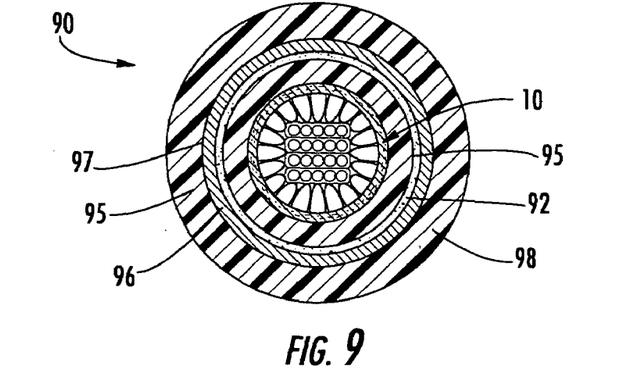
FIG. 9 is a cross-sectional view of a fiber optic cable with an armor layer according to the present invention.

FIG. 9 depicts cable 90, which is another embodiment of the present invention that employs tube assembly 10. Cable 90 includes a sheath system 97 about tube assembly 10 for protecting tube assembly 10 from, for instance, crushing forces and environmental effects. In this case, sheath system 97 includes a water-swellable tape 92 that is secured by a binder thread (not visible), a pair of ripcords 95, an armor tape 96, and a jacket 98. The pair of ripcords 95 are generally disposed about one-hundred and eighty degrees apart with about ninety degree intervals from the armor overlap, thereby inhibiting the shearing of ripcord on an edge of the armor tape during use. In preferred embodiments, ripcords suitable for ripping through an armor tape have a construction as disclosed in U.S. patent application Ser. No. 10/652, 046 filed on Aug. 29, 2003, the disclosure of which is incorporated herein by reference. Armor tape 96 can be either a dielectric or a metallic material. If a dielectric armor tape is used the cable may also include a metallic wire for locating the cable in buried applications. In other words, the metallic wire makes the cable tonable. Jacket 98 generally surrounds armor tape 96 and provides environmental protection to cable 90. Of course, other suitable sheath systems may be used about the tube assembly.

FIG. 10 depicts fiber optic cable 100. Cable 100 includes at least one optical waveguide 12 and a dry insert 14 forming a cable core 101 within a sheath system 102. In other words, cable 100 is a tubeless design since access to the cable core 101 is accomplished by solely cutting open sheath system 102. Stated another way, the sheath system 102 is the "tube" that houses cable core 101. Sheath system 102 also includes strength members 102a embedded therein and disposed at about 180 degrees apart, thereby imparting a preferential bend to the cable. Of course, other sheath systems configurations such as different types, quantities, and/or placement of strength members 102a are possible. Cable 100 may also include one or more ripcords 105 disposed between cable core 101 and sheath 102 for ripping sheath 102, thereby allowing the craftsman easy access to cable core 101.

Figure 11:
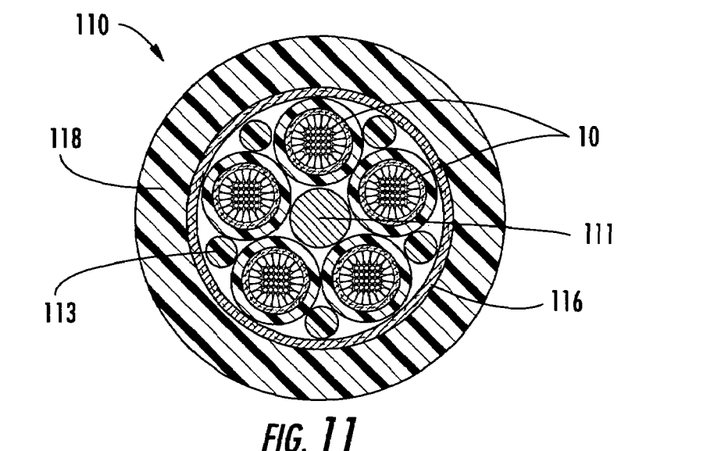
FIG. 11 is a cross-sectional view of a fiber optic cable having stranded tubes according to the present invention.

FIG. 11 depicts a fiber optic cable 110 having a plurality of tube assemblies 10 stranded about a central member 111. Specifically, tube assemblies 10 along with a plurality of filler rods 113 are S-Z stranded about central member 111 and are secured with one or more binder threads (not visible), thereby forming a stranded cable core. The stranded cable core has a water-swellable tape 116 there about, which is secured with a binder thread (not visible) before jacket 118 is extruded thereover. Optionally, aramid fibers, other suitable strength members and/or water blocking components such as water-swellable yarns may be stranded about central member 111, thereby forming a portion of the stranded cable core. Likewise, water-swellable components such as a yarns or tape may be placed around central member 111 for inhibiting water migration along the middle of cable 110. Other variations of cable 110 can include an armor tape, an inner jacket, and/or different numbers of tube assemblies.

Many modifications and other embodiments of the present invention, within the scope of the appended claims, will become apparent to a skilled artisan. For example, optical waveguides can be formed in a variety of ribbon stacks or configurations such as a stepped profile of the ribbon stack. Cables according to the present invention can also include more than one optical tube assembly stranded helically, rather than S-Z stranded configurations. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or cable configurations. For instance, dry inserts of the present invention are suitable for other types of tubeless cables having a sheath around a cable core.

The invention claimed is:

1. An optical tube assembly comprising:
   a tube;
   at least one optical waveguide, the optical waveguide being disposed in the tube; and
   a dry insert, the dry insert comprising a tape and at least one filament attached to the tape so that the at least one filament forms a plurality of loops on the tape, the dry insert being disposed adjacent to the at least one optical waveguide and coupling the at least optical waveguide with the tube while maintaining an optical attenuation below about 0.3 dB/km.

2. The optical tube assembly of claim 1, the dry insert having at least one water-swellable substance for blocking the migration of water along the tube.

3. The optical tube assembly of claim 1, the dry insert being compressed by about 10% or more, thereby coupling the at least one optical waveguide with the tube.

4. The optical tube assembly of claim 3, the dry insert having at least one water-swellable substance for blocking the migration of water along the tube.

5. The optical tube assembly of claim 1, the dry insert being compressed by about 90% or less, thereby coupling the at least one optical waveguide with the tube.

6. The optical tube assembly of claim 1, the at least one filament of the dry insert having a water-swellable component.

7. The optical tube assembly of claim 1, the at least one optical waveguide and the dry insert forming a core, the core having a pull-out force between about 0.2 N/m and about 5.0 N/m for a 100 meter length.

8. The optical tube assembly of claim 1, the at least one optical waveguide and the dry insert forming a core, the core having a pull-out force between about 1 N/m and about 3 N/m for a 100 meter length.

9. The optical tube assembly of claim 1, the dry insert having the at least one filament attached to the tape so that the uncompressed height of the dry insert is about 5 millimeters or less.

10. The optical tube assembly of claim 1, the dry insert disposed so that the at least one filament is facing towards the at least one optical waveguide.

11. The optical tube assembly of claim 1, the dry insert having the at least one filament on a first side of the tape and a second filament on a second side of the tape.

12. The optical tube assembly of claim 1, the dry insert having a height h that varies across a width w of the dry insert.

13. The optical tube assembly of claim 1, the dry insert having a plurality of filaments that are intermittently attached to the tape.

14. The optical tube assembly of claim 1, the optical tube assembly being a portion of a fiber optic cable.

15. The optical tube assembly of claim 1, further including a strength member.

16. An optical tube assembly comprising:
   a tube, the tube having an interior surface;
   at least one optical waveguide, the optical waveguide being disposed in the tube; and
   a dry insert, the dry insert is disposed adjacent to the at least one optical waveguide and comprises a tape and at least one filament attached to the tape, thereby forming a plurality of loops with the filament on the tape, wherein either the tape or the at least one filament has a water-swellable component and the dry insert is compressed at least 10 percent for coupling the at least one waveguide to the interior surface of the tube.

17. The optical tube assembly of claim 16, the compression of the dry insert being about 90% or less.

18. The optical tube assembly of claim 16, the tape of the dry insert being a foam tape.

19. The optical tube assembly of claim 16, the water-swellable component being a water-swellable tape.

20. The optical tube assembly of claim 16, the dry insert having a first type of filament and a second type of filament.

21. The optical tube assembly of claim 16, the at least one optical waveguide and the dry insert forming a core, the core having a pull-out force between about 0.2 N/m and about 5.0 N/m for a 100 meter length.

22. The optical tube assembly of claim 16, the at least one optical waveguide and the dry insert forming a core, the core having a pull-out force between about 1 N/m and about 3 N/m for a 100 meter length.

23. The optical tube assembly of claim 16, the dry insert having an uncompressed height of about 5 millimeters or less.

24. The optical tube assembly of claim 16, the dry insert generally surrounding the at least one optical waveguide.

25. The optical tube assembly of claim 16, the at least one filament of the dry insert having a water-swellable component.

26. The optical tube assembly of claim 16, the dry insert being formed from two or more water-swellable components.

27. The optical tube assembly of claim 16, the dry insert having a height h that varies across a width w of the dry insert.

28. The optical tube assembly of claim 16, the dry insert having a plurality of filaments that are intermittently attached to the tape.

29. The optical tube assembly of claim 16, the optical tube assembly being a portion of a fiber optic cable.

30. The optical tube assembly of claim 16, further including a strength member.

31. An optical tube assembly comprising:
a tube, the tube having an interior surface;
at least one optical waveguide, the optical waveguide being disposed in the tube; and
a dry insert, the dry insert comprising a tape and at least one filament attached to the tape to form a plurality of loops on the tape, wherein the dry insert and the at least one optical waveguide form a core disposed within the tube, the core having a pull-out force between about 0.2 N/m and about 5.0 N/m for a 100 meter length.

32. The optical tube assembly of claim 31, the at least one optical waveguide and the dry insert forming a core, the core having a pull-out force between about 1 N/m and about 3 N/m for a 100 meter length.

33. The optical tube assembly of claim 32, the dry insert having at least one water-swellable substance for blocking the migration of water along the tube.

34. The optical tube assembly of claim 31, the dry insert having a height h that varies across a width w of the dry insert.

35. The optical tube assembly of claim 31, the compression of the dry insert being about 10% or more.

36. The optical tube assembly of claim 31, the compression of the dry insert being about 90% or less.

37. The optical tube assembly of claim 31, the dry insert having at least one water-swellable substance for blocking the migration of water along the tube.

38. The optical tube assembly of claim 36, the dry insert having a first type of filament and a second type of filament.

39. The optical tube assembly of claim 31, the dry insert having an uncompressed height of about 5 millimeters or less.

40. The optical tube assembly of claim 31, the dry insert having a plurality of filaments that are intermittently attached to the tape.

41. The optical tube assembly of claim 31, the optical tube assembly being a portion of a fiber optic cable.

42. The optical tube assembly of claim 31, further including a strength member.

43. A method of manufacturing an optical tube assembly comprising:
paying off at one optical waveguide;
placing a dry insert adjacent to the at least one optical waveguide, thereby forming a dry core, wherein the dry insert comprises a tape and at least one filament attached to the tape so that the at least one filament forms a plurality of loops on the tape; and
extruding a tube around the dry core.

44. The method according to claim 43, the method further comprising extruding a cable jacket around the optical tube assembly.

45. The method according to claim 43, the dry insert having at least one water-swellable substance for blocking the migration of water along the tube.

* * * * *